C. K. DEUTSCH.
GLOBES FOR LAMPS AND GAS-FIXTURES.

No. 178,419.   Patented June 6, 1876.

Attest:

Chas. K. Deutsch,
Inventor.

By W. Osgood,
Attorney.

UNITED STATES PATENT OFFICE.

CHARLES K. DEUTSCH, OF NEW YORK, N. Y., ASSIGNOR TO THE UNIVERSAL LAMP AND REFLECTOR COMPANY.

IMPROVEMENT IN GLOBES FOR LAMPS AND GAS-FIXTURES.

Specification forming part of Letters Patent No. 178,419, dated June 6, 1876; application filed May 24, 1876.

*To all whom it may concern:*

Be it known that I, CHARLES K. DEUTSCH, of the city of New York, county and State of New York, have invented certain new and useful Improvements in Globes for Lamps and Gas-Fixtures, of which the following is a specification, reference being had to the accompanying drawings, forming part of the same, in which—

Figure 1:
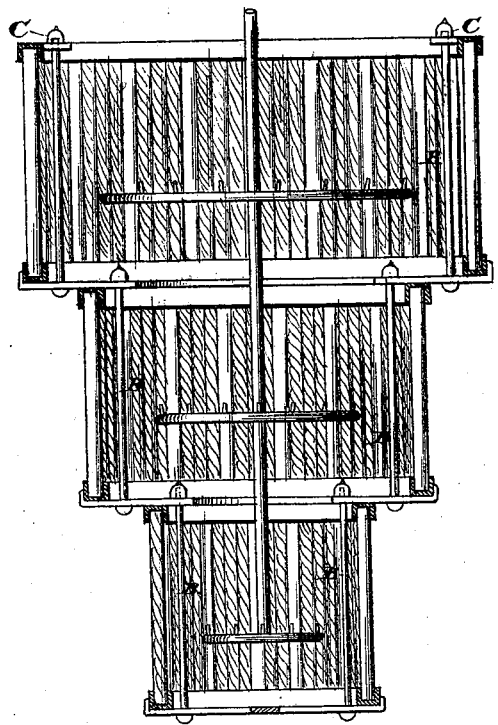
Figure 3:
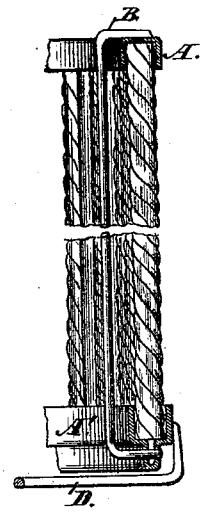
Figure 2:
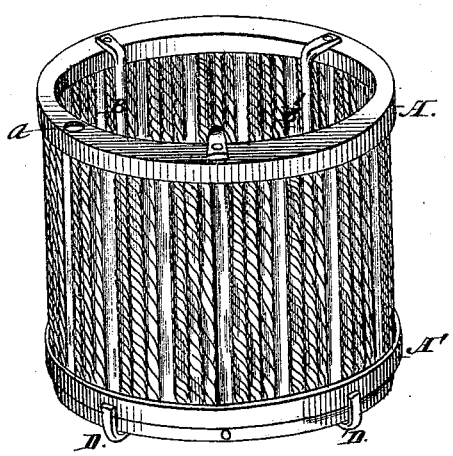
Figure 4:
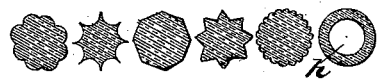

Figure 1 represents a chandelier having globes of varying diameters, placed one above another. Fig. 2 is a perspective view of a single globe, showing the glass cylinders in position within their frames. Fig. 3 is a sectional elevation of a portion of the globe, showing the position of the rods which connect the upper and lower rims or bands, and a portion of the ordinary globe-holder. Fig. 4 shows, in cross-section, several of the numerous configurations which I contemplate giving the glass cylinders or rods.

The object of my present invention is to so construct a globe or shade, to be used in connection with any lighting apparatus, that the rays of light may be refracted with the same power as with the ordinary lens, and give, at the same time, a softened or mellowed light, not injurious to the eyes; to accomplish which it (the invention) consists in providing a substantial metallic frame, into which are placed a series of glass prisms or rods, which should be similarly curved upon each side, or be symmetrical with respect to their vertical axes, and, at the same time, be capable of being easily and readily removed, as will be hereinafter explained.

The frame consists of an upper and lower rim, A A', united by connecting-rods B. To make up the globe I secure the glass rods in the frame by slightly inclining each one and dropping its ends into the grooves until the frame is nearly filled, when those remaining are inserted through the hole $a$, provided in the upper rim.

The glass of which the rods are composed being of uniform quality, the powers of the several lenses will depend upon the area of their cross-section. Light of various degrees of intensity may, therefore, be obtained by varying the rods within the frame, for which purpose they are suitably numbered and graduated; and colored rods may be employed to give differently-colored lights.

To produce the colored lights, the rods or lenses are stained in any well-known manner; or they may be made hollow, as indicated at $h$, Fig. 4, and suitably-colored substances placed therein. The flutings or corrugations upon the rods serve to soften the light, so that its effect upon the eyes is not injurious, no matter how intense it may be; and they act in a manner similar to, but superior to, the flutings or corrugations upon the reflectors in common use.

For convenience in packing for shipment I provide the connecting-rods B with nuts C, by unscrewing which the two rims may be readily disengaged from the rods. These rods I prefer to locate upon the interior of the globe, in which position they intercept less light than when upon the outside, though it will be observed that they may be otherwise placed. By the construction adopted it is apparent that both the intensity and color of the light may be regulated at pleasure by simply substituting the proper lenses.

In Fig. 1 the chandelier shown is made up of a number of sections of varying diameters, connected to each other through the medium of suitable horizontal rods, and shows the application of the invention to a number of lights. In case of a single burner the ordinary globe-holder may be employed, as at D, Figs. 2 and 3, and the device used precisely as is the common globe.

By making up the globe in sections, with differently sized and colored lenses, light of various intensities and colors may be thrown upon the same object by simply revolving the globe upon its supports.

It is not essential that the rods be placed in a vertical position, as all the advantages and effects of the invention could be derived by placing them horizontally.

I contemplate using my invention in connection with all lighting apparatus; but I find that it is particularly applicable to hall and billiard lights, chandeliers, lanterns, lamps, drop-lights, and to signs of various characters.

I am aware of certain attempts to construct a lamp-chimney of vertical rods immovably connected in an upper and lower frame. In such chimneys the interstices between the several lenses permit the entrance of air along the sides of the chimney, and destroy its usefulness.

I am also aware that glass lenses for lanterns, &c., having one plain and one corrugated face, or two corrugated faces on one piece of glass, have been used. These fail to give the maximum advantages of a series of distinct and complete lenses having opposite faces equally curved, are not variable or interchangeable, and require more room for packing. Moreover, fracture of one of the ribs on such lenses damages the whole lens.

Having now fully described my invention, what I claim as new, and desire to secure by Letters Patent, is—

1. The removable symmetrical glass rods or prisms, in combination with the upper and lower connected rims, which hold said rods loosely in place, forming a globe for lamps and gas-fixtures, substantially as described.

2. The combination, with a globe constructed of symmetrical glass rods or prisms, loosely held in place by the upper and lower connected rims A and A', of the globe-holder D, substantially as set forth.

Witness my hand this 19th day of May, 1876.

C. K. DEUTSCH.

Witnesses:
J. HENRY FORD,
H. D. HUTTON.